(Model.)
W. K. HARDENBROOK.
TRACE HOLDER.
No. 243,887.            Patented July 5, 1881.
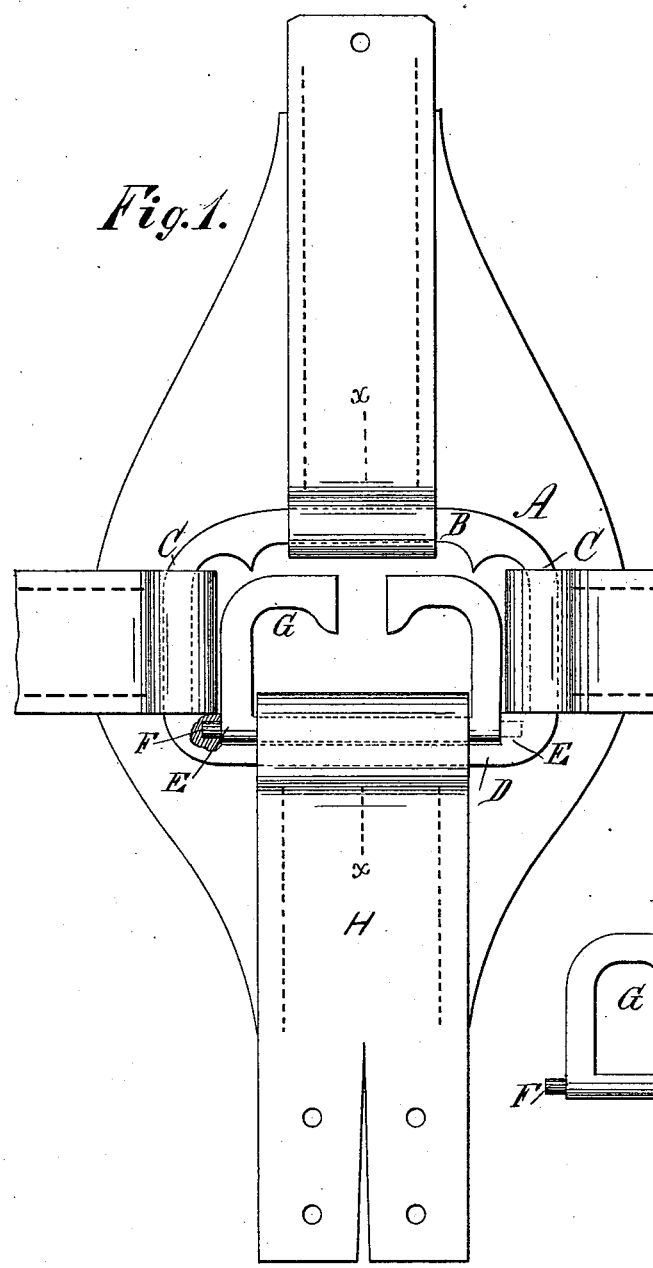
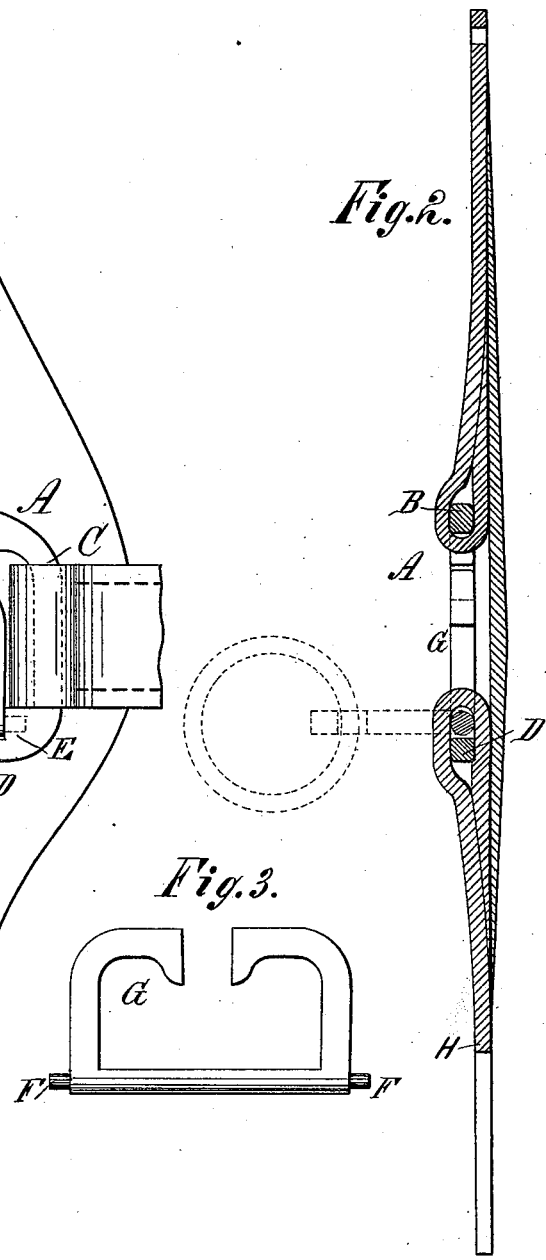
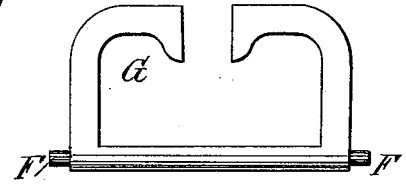
WITNESSES:
INVENTOR:
ATTORNEYS.

UNITED STATES PATENT OFFICE.

WILLIAM K. HARDENBROOK, OF ALBIA, IOWA.

TRACE-HOLDER.

SPECIFICATION forming part of Letters Patent No. 243,887, dated July 5, 1881.

Application filed May 18, 1881. (Model.)

*To all whom it may concern:*

Be it known that I, WILLIAM K. HARDENBROOK, of Albia, in the county of Monroe and State of Iowa, have invented a new and useful Improvement in Trace-Holders, of which the following is a full, clear, and exact description.

In the accompanying drawings, Figure 1 is a plan view of the holder complete, part being broken away. Fig. 2 is a section on line $x\ x$ of Fig. 1, and Fig. 3 is an elevation of the hook detached.

Similar letters of reference indicate corresponding parts.

The object of this invention is to improve the construction of the trace-holders for which Letters Patent No. 198,295 were granted to me December 18, 1877, in such a manner as to simplify their construction, increase their durability, and facilitate repairs.

The invention consists in constructing the frame of the holder with sockets or recesses at the ends of its rear bar, and the double hook with pivots at its rear corners, to adapt the said frame and double hook to be held in connection by the crupper-strap, as will be hereinafter fully described.

A represents the frame, which is made with a front loop or bar, B, to receive the back-strap, and end loops or bars, C, to receive the hip-straps. The rear bar, D, is made straight, and in the frame A, at the ends of the bar D, are formed half-round recesses or sockets to receive the pivots F, formed upon the rear corners of the double hook G. The double hook G is made of such a size as to enter the cavity of the frame A, so that it can be turned up to receive the cockeyes of the tugs or traces, and can be turned down within the frame A when not required for use, and thus presents no projecting part for the reins or the horse's tail to catch upon. The rear bar of the double hook G is straight, and is parallel with the rear bar of the frame A, so that the said double hook G can be secured in place in the said frame A by the crupper-strap H.

With this construction the frame A and the double hook G can be readily cast, and should either the frame or the double hook break the broken part can be replaced by ripping the stitching of the crupper-strap.

With this construction, also, the holder will be very durable, as there is no part especially liable to break.

Having thus fully described my invention, what I claim as new, and desire to secure by Letters Patent, is—

As an improved article of manufacture, the trace-holder, constructed substantially as herein shown and described, consisting of the frame A, having recesses or sockets E, and the double hook G, having pivots F, to adapt the said frame and double hook to be held in connection by the crupper-strap, as set forth.

WILLIAM K. HARDENBROOK.

Witnesses:
HENRY F. ALEXANDER,
THOMAS B. TATE.